United States Patent
Nishio

(10) Patent No.: US 8,158,260 B2
(45) Date of Patent: *Apr. 17, 2012

(54) MOLDING METHOD AND MOLDED ARTICLE OF FLUOROPOLYMER WITH MULTILAYERED PARTICULATE STRUCTURE

(75) Inventor: Takao Nishio, Shimizu (JP)

(73) Assignee: Dupont Mitsui Fluorochemicals Co Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/807,715

(22) Filed: May 29, 2007

(65) Prior Publication Data

US 2007/0281166 A1     Dec. 6, 2007

(30) Foreign Application Priority Data

Jun. 2, 2006  (JP) ................................. 2006-155380

(51) Int. Cl.
B32B 27/08    (2006.01)
B32B 27/28    (2006.01)
C08L 27/18    (2006.01)

(52) U.S. Cl. ........ 428/422; 428/421; 264/113; 264/127; 525/199; 525/197; 528/503

(58) Field of Classification Search ................. 428/421, 428/422; 264/113, 127; 525/199, 197
See application file for complete search history.

(56) References Cited

U.S. PATENT DOCUMENTS

| | | | |
|---|---|---|---|
| 3,085,083 A | | 4/1963 | Schreyer |
| 3,142,665 A | | 7/1964 | Cardinal et al. |
| 3,391,099 A | * | 7/1968 | Punderson .................... 524/777 |
| 4,469,846 A | * | 9/1984 | Khan et al. ....................... 525/72 |
| 4,743,658 A | | 5/1988 | Imbalzano et al. |
| 5,021,259 A | * | 6/1991 | Singelyn ....................... 427/115 |
| 5,198,502 A | | 3/1993 | Tatemoto |
| 5,266,639 A | * | 11/1993 | Chapman et al. ............. 525/200 |
| 5,296,165 A | * | 3/1994 | Shimizu et al. ................. 516/77 |
| 5,494,752 A | * | 2/1996 | Shimizu et al. ............... 428/407 |
| 5,506,281 A | | 4/1996 | Muhlbauer |
| 5,607,766 A | * | 3/1997 | Berger .......................... 428/373 |
| 5,620,641 A | * | 4/1997 | Berger .......................... 264/103 |
| 5,633,082 A | * | 5/1997 | Berger .......................... 428/365 |
| 5,780,552 A | * | 7/1998 | Kerbow ........................ 525/276 |
| 6,310,141 B1 | | 10/2001 | Chen et al. |
| 6,649,699 B2 | | 11/2003 | Namura |
| 7,019,083 B2 | * | 3/2006 | Grootaert et al. ............. 525/276 |
| 7,030,191 B2 | | 4/2006 | Namura |
| 7,135,527 B2 | * | 11/2006 | Park .............................. 525/199 |
| 7,462,675 B2 | * | 12/2008 | Chang et al. .................. 526/247 |
| 2004/0266914 A1 | | 12/2004 | Yamauchi et al. |

FOREIGN PATENT DOCUMENTS

| | | |
|---|---|---|
| EP | 0 606 493 A1 | 7/1994 |
| EP | 1 340 773 A2 | 9/2003 |
| JP | 56-26242 | 6/1981 |
| JP | 2003231722 A | 8/2003 |
| WO | WO 2006/060524 A2 | 6/2006 |

OTHER PUBLICATIONS

William D. Callister, Materials Science and Engineering: An Introduction, 2003, John Wiley & Sons, Inc., Sixth Edition, 740, 753.*
Lynch, Charles T., ed. Practical Handbook of Materials Science. Section 12: Polymeric Materials. pp. 553. CRC Press, Inc., Boca Raton, Florida: 1989.*
PCT International Search Report and Written Opinion for International Application No. PCT/US2007/012994 dated Jan. 2, 2008.

* cited by examiner

Primary Examiner — Randy Gulakowski
Assistant Examiner — Mike M Dollinger

(57) ABSTRACT

A fluoropolymer molding method and the resulting molded article are disclosed where the fluoropolymer is composed of fluoropolymer particles each having a multi-layer structure that consists of at least two types of fluoropolymers having different melting points, with at least one inner layer made of a fluoropolymer with a melting point higher than that of the outermost fluoropolymer. The fluoropolymer of the at least one inner layer is molded at a temperature higher than the melting point of the lowest melting point of the fluoropolymers that form the outermost layers of the multi-layer-structure fluoropolymer particles, and lower than the melting point of the fluoropolymer having the highest melting point. The resulting articles have excellent chemical liquid resistance and gas impermeability and low linear expansion coefficient.

7 Claims, No Drawings

MOLDING METHOD AND MOLDED ARTICLE OF FLUOROPOLYMER WITH MULTILAYERED PARTICULATE STRUCTURE

BACKGROUND OF THE INVENTION

1. Field of the Invention

The present invention pertains to a method of molding fluoropolymer and the molded article obtained using the method characterized by the fact that the molded article has excellent resistance to chemical solutions, excellent gas impermeability, and low linear expansion coefficient.

2. Description of Related Art

Fluoropolymers having excellent heat resistance and chemical resistance and other characteristics are used in manufacturing articles such as pipelines, tanks, and other lining materials, as well as chemical liquid transfer pipelines, joints, and chemical liquid storage containers, especially for use in semiconductor manufacturing processes and in chemical plants.

Among said fluoropolymers, polytetrafluoroethylene (PTFE) has the best heat resistance, chemical resistance, and other characteristics. PTFE is not melt processible because it has an extremely high melt viscosity (at least $10^8$ Pa·s at 380° C.). Therefore, it cannot be molded by such conventional polymer processing methods as melt extrusion molding, injection molding, blow molding, transfer molding, melt compression molding, or other melt processing methods.

As a result, for PTFE lacking melt processibility, molding is performed by means of paste extrusion molding, compression molding, or other non-melt processing method. In the paste extrusion molding, shear is applied to a mixture of fine powder PTFE and lubricant (typically a hydrocarbon) to make a paste, which is extruded at a low temperature (lower than 75° C.). In compression molding, the granular PTFE powder, kept at a temperature higher than the crystalline transition point (about 19° C.), is charged to a casting mold for compression and then heated (sintered) to form the desired article.

However, in the paste extrusion molding method, after the extrusion, the lubricant must be removed. Residues of the lubricant remaining in the molding (molded article) can be carbonized, leading to contamination and discoloration of the molding, and deterioration in properties such as chemical resistance, electric characteristics. In addition, in removing the lubricant, it is necessary to raise the temperature gradually in order to prevent cracking due to too rapid volatilization (bumping) of the lubricant. This is undesirable.

In the case of compression molding, the molded article is limited to simple shapes. When PTFE moldings in complicated shapes are desired, mechanical processing (machining) has to be performed on blocks of PTFE formed by compression molding. This is a complex and expensive process.

An alternative to PTFE is tetrafluoroethylene/perfluoro (alkyl vinyl ether) copolymer (PFA). It has heat resistance and chemical resistance as good as that of PTFE, but being melt processible, it can be processed by such conventional polymer processing methods as melt extrusion molding, blow molding, transfer molding, and melt compression molding. Therefore articles of PFA can be mass produced at a cost lower than comparable articles of PTFE. This is an advantage.

However, PFA has chemical liquid resistance and gas impermeability properties inferior to those of PTFE. As a result, it has been proposed that PTFE be blended in PFA so as to increase the crystallinity of the molding to improve the chemical liquid resistance and gas impermeability. However, the PTFE usually employed as a molding powder has a high molecular weight, so that as the quantity added to PFA is increased, the viscosity rises drastically, and melt processing becomes difficult to perform. This is undesirable. On the other hand, when such a composition with a higher viscosity is used to perform compression molding, paste extrusion molding, or other non-melt processing just as for PTFE, the shape is restricted, and productivity deteriorates significantly so that this scheme is not practical.

Japanese Kokai Patent Application No. 2002-167488 (equivalent: U.S. Pat. No. 6,649,699) and Japanese Kokai Patent Application No. 2003-327770 (equivalent: U.S. Pat. No. 7,030,191) propose a scheme in which a low-molecular weight PTFE is used to prevent rise in the viscosity so as to enable melt processing and to improve the chemical resistance and gas impermeability. However, for the method of adding low-molecular weight PTFE, the quantity added is limited, and this is undesirable.

In addition, for molded articles prepared by sintering at a temperature higher than the melting point, the linear expansion coefficient of the resulting article is higher than that of the other materials, and, when used at a high temperature, problems occur. For example, a pipe fixed between joints will bend, affecting the sealing of the joints, allowing leaks. This is undesirable. Because the linear expansion coefficient is inversely related to the crystallinity of the molding, it is preferred that the crystallinity (crystalline fraction) of the molding be as high as possible and the amorphous (noncrystalline) fraction of the polymer be kept low. However, although the crystallinity of the molding can be increased by slowly cooling after sintering, the amount of crystallinity lost in the sintering process cannot be completely restored to the fraction present in PTFE as-polymerized, i.e. before sintering. Therefore this method inevitably results in some deterioration in the chemical liquid resistance, gas impermeability and linear expansion coefficient.

SUMMARY OF THE INVENTION

The purpose of the present invention is to develop a type of molded article that can be made by melt processing and that has excellent chemical liquid resistance and gas impermeability as well as low linear expansion coefficient.

That is, the present invention provides a method of molding fluoropolymer with excellent chemical liquid resistance and gas impermeability and low linear expansion coefficient by means of melt processing.

The present invention provides a type of molded article with excellent chemical liquid resistance and gas impermeability and low linear expansion coefficient obtained using said method.

The present invention provides a fluoropolymer molding method wherein the fluoropolymer comprises fluoropolymer particles each having a multi-layer structure consisting of at least two types of fluoropolymers having different melting points, with at least one inner layer made of a fluoropolymer having a melting point higher than that of the outermost fluoropolymer; said fluoropolymer is molded at a temperature higher than the melting point of the fluoropolymer of the outermost layer, or, when there are multiple types of said multi-layer-structure fluoropolymer particles, higher than the lowest melting point among the melting points of the fluoropolymers that form the outermost layers of said multi-layer-structure fluoropolymer particles, and lower than the melting point of the fluoropolymer having the highest melting point.

As a preferred embodiment of the fluoropolymer molding method of the present invention, the fluoropolymer particle is comprised of polymer selected from at least two of the following types: polytetrafluoroethylene, tetrafluoroethylene/perfluoro(alkyl vinyl ether) copolymer, tetrafluoroethylene/hexafluoropropylene copolymer, ethylene/tetrafluoroethylene copolymer, ethylene/chlorotrifluoroethylene copolymer, polychlorotrifluoroethylene, and polyvinylidene fluoride, and polyvinyl fluoride.

As a preferred embodiment of the present invention, in the fluoropolymer molding method, the fluoropolymer particles are made of polytetrafluoroethylene and tetrafluoroethylene/perfluoro(alkyl vinyl ether) copolymer.

As a preferred embodiment of the present invention, in the molding method of fluoropolymer, at least one inner layer is polytetrafluoroethylene.

As a preferred embodiment of the present invention, in the molding method of fluoropolymer, the outermost layer of the multi-layer-structure fluoropolymer particle is tetrafluoroethylene/perfluoro(alkyl vinyl ether) copolymer, and at least one inner layer is polytetrafluoroethylene.

As a preferred embodiment of the present invention, in the fluoropolymer molding method, the heat of fusion ($\Delta Hf$) of said polytetrafluoroethylene is 45 J/g or greater.

As a preferred embodiment of the present invention, in the fluoropolymer molding method, the multi-layer-structure fluoropolymer particles are a mixture containing at least two types of multi-layer-structure fluoropolymer particles.

As a preferred embodiment of the present invention, in the fluoropolymer molding method, the multi-layer-structure fluoropolymer particles are a mixture of at least one type of multi-layer-structure fluoropolymer and at least one type of non-multi-layer-structure fluoropolymer.

Also, the present invention provides a type of molded article characterized by the fact that it is prepared using said fluoropolymer molding method.

As a preferable embodiment of the present invention, the molded article has a linear expansion coefficient at 100-150° C. of $15 \times 10^{-5}$/K or less.

As a preferable embodiment of the present invention, for the molded article, the specific gravity of the molded article is 2.180 or greater.

DETAILED DESCRIPTION OF THE INVENTION

The present invention provides a molding method of fluoropolymer with excellent chemical liquid resistance and gas impermeability and low linear expansion coefficient, and the present invention provides the molded article prepared using the molding method.

According to the fluoropolymer molding method of the present invention, the fluoropolymer is composed of fluoropolymer particles each having a multi-layer structure consisting of at least two types of fluoropolymers having different melting points; said fluoropolymer being molded at a temperature higher than the melting point of the fluoropolymer of the outermost layer and lower than the melting point of the fluoropolymer on the inner side and having the highest melting point. As a result, it is possible to maintain a high crystallinity for the fluoropolymer having a high melting point, providing thereby a type of molded article with excellent chemical liquid resistance and gas impermeability and low linear expansion coefficient.

Also, according to the fluoropolymer molding method of the present invention, it is possible to perform molding of the fluoropolymer by melt processing. As a result, it is possible to provide PTFE-like moldings with complicated shapes.

The molded article of the present invention has excellent chemical liquid resistance and gas impermeability and low linear expansion coefficient. As a result, the molded article with said excellent characteristics can be used in various fields, such as semiconductor applications, CPI applications, OA applications, sliding material applications, automobile applications (such as parts in the engine compartment, electrical wires, oxygen sensors, fuel hoses), printed circuit board applications among other things.

The present invention provides a fluoropolymer molding method characterized by the following facts: the fluoropolymer is composed of fluoropolymer particles each having a multi-layer structure consisting of at least two types of fluoropolymers having different melting points, with at least one inner layer made of a fluoropolymer having a melting point higher than that of the outermost fluoropolymer; the fluoropolymer of the at least one inner layer being molded at a temperature higher than the melting point of the fluoropolymer of the outermost layer, or, when there are multiple types of said multi-layer-structure fluoropolymer particles, higher than the lowest melting point among the melting points of the fluoropolymers that form the outermost layers of said multi-layer-structure fluoropolymer particles, and lower than the melting point of the fluoropolymer having the highest melting point.

Also, the present invention provides a type of molded article manufactured using the aforementioned fluoropolymer molding method.

As a preferred embodiment of the fluoropolymer molding method of the present invention, the fluoropolymer is a polymer selected from at least two from the following types: polytetrafluoroethylene, tetrafluoroethylene/perfluoro(alkyl vinyl ether) copolymer (PFA), tetrafluoroethylene/hexafluoropropylene copolymer (FEP), ethylene/tetrafluoroethylene copolymer (ETFE), ethylene/chlorotrifluoroethylene copolymer, polychlorotrifluoroethylene, and polyvinylidene fluoride, and polyvinyl fluoride. ETFE generally contains a third monomer, such as perfluorobutylethylene, in a concentration of 1-10 mole %.

Among these, it is preferred that the high-melting point fluoropolymer is polytetrafluoroethylene, and the low-melting point fluoropolymer is PFA and/or FEP. It is preferred that the heat of fusion ($\Delta Hf$) of polytetrafluoroethylene be 45 J/g or greater. If the heat of fusion ($\Delta Hf$) is lower than 45 J/g, crystallinity is less, and the effect in realizing excellent chemical liquid resistance and gas impermeability and low linear expansion coefficient becomes less significant.

From the viewpoint of smoothness of the surface of the molded article, it is preferred that the melt flow rate (MFR) of the polytetrafluoroethylene be 1 g/10 min or lower. If a polytetrafluoroethylene with MFR higher than 1 g/10 min, that is, a low-molecular weight polytetrafluoroethylene, is used, there is a tendency for the surface of the molded article to become rough, so this is not preferred. For measurement of MFR, the PTFE is polymerized according to the conditions to be used in making the multi-layer particle, but polymerization is stopped at the point at which the second layer is to be made. The PTFE is isolated, dried, and the MFR measured according to the procedure given in the Examples section that follows.

The polytetrafluoroethylene refers to polytetrafluoroethylene (PTFE), or a copolymer made of tetrafluoroethylene and 2 wt % or less of copolymerizable fluorine-containing monomers (hereinafter to be referred to as modified PTFE, and being like PTFE, not melt processable with conventional plastics processing equipment such as melt extruders). The content of the copolymerizable fluorine-containing monomers should be 2 wt % or less, preferably 1.5 wt % or less, and more preferably 1 wt % or less.

Examples of the fluorine-containing monomers that can be copolymerized with said tetrafluoroethylene to make modified PTFE include C-3 or higher, or preferably C3-6, perfluoroalkenes, C1-6 perfluoro(alkyl vinyl ethers), and chlorotrifluoroethylene. Specific examples of the fluorine-containing monomers include hexafluoropropylene (HFP), perfluoro(methyl vinyl ether) (PMVE), perfluoro(ethyl vinyl ether) (PEVE), perfluoro(propyl vinyl ether) (PPVE), perfluoro(butyl vinyl ether) (PBVE), and chlorotrifluoroethylene. Among these, hexafluoropropylene (HFP), perfluoro(ethyl vinyl ether) (PEVE) and perfluoro(propyl vinyl ether) (PPVE) are preferred. Hexafluoropropylene (HFP) is more preferred.

The fluoropolymer with multi-layer structure refers to the fluoropolymer composed of fluoropolymer particles each having a multi-layer (two or more layers) structure with a polymer layer formed on the outer side of a polymer layer forming the central portion. Each fluoropolymer particle having said multi-layer structure may be composed of two or more polymer layers. The multi-layer-structure fluoropolymer particle of the present invention is a fluoropolymer particle having at least two fluoropolymer layers with different melting points, with at least one inner layer having a melting point higher than that of the fluoropolymer in the outermost layer. That is, it is preferred that the fluoropolymer particle of the present invention have a core-shell fluoropolymer particle structure. However, there is no need to specify which layer is the core and which layer is the shell. As long as the particle has a multi-layer structure, that is sufficient.

As a preferred method for preparing the fluoropolymer with said multi-layer structure, after the central portion is formed by emulsion polymerization, the monomer feed composition is changed, either gradually or at once, to the composition that will give a second layer of the desired polymer. This process may be repeated as additional layers are to be added. Alternatively, the central portion is polymerized by emulsion polymerization, and the resulting dispersion is transferred to a second vessel and polymerization is resumed under conditions and monomer concentration that will give a second layer of the desired composition. This process may be repeated as additional layers are to be added.

For the fluoropolymer water based dispersion containing the multi-layer particles of this invention, it is preferred that fluoropolymer particles have an average particle diameter in the range of 0.01-0.40 µm, or preferably in the range of 0.05-0.3 µm and be 25-70 wt % of the dispersion, the remainder being principally water with residues of the polymerization, such as surfactant and salts.

Conventional polymerization procedures can be adopted appropriately for forming the fluoropolymer water based dispersion, and the fluoropolymer water based dispersion having a multi-layer structure. For the fluoropolymer water based dispersion, the methods described in the following patents may be adopted appropriately: Japanese Kokoku Patent Application No. Sho 37[1962]-4643, Japanese Kokoku Patent Application No. Sho 46[1971]-14466 (equivalent: U.S. Pat. No. 3,391,099), and Japanese Kokoku Patent Application No. Sho 56[1981]-26242. Additionally, for the fluoropolymer water based dispersion having a multi-layer structure, the methods described in the following patents may be adopted appropriately: Japanese Kokai Patent Application No. 2003-231722, Japanese Kokai Patent Application No. 2003-213196 (equivalent: U.S. patent application Ser. No. 2004/0266914), and Japanese Patent Application Domestic Announcement No. 2004-507571 (equivalent: U.S. Pat. No. 6,310,141).

For the fluoropolymer having said multi-layer structure composed of at least two types of fluoropolymers with different melting points, it is preferred that the proportion of the fluoropolymer in the outermost layer be in the range of 90-5 wt %, and the proportion of the high-melting point fluoropolymer in the inner layer be in the range of 10-95 wt %. The proportions of the outermost layer and the inner layer should be determined taking into consideration the desired properties such as chemical liquid resistance, gas impermeability, linear expansion coefficient, highest strength, and elongation. From the viewpoint of maintaining of the crystallinity of the molded article, it is preferred that the proportion of the high-melting point fluoropolymer be 10 wt % or greater. Also, from the viewpoint of mechanical strength (highest strength and elongation) of the obtained molded article, the proportion of the low-melting point fluoropolymer is preferably 5 wt % or greater.

For the multi-layer-structure fluoropolymer of the present invention, as a preferred embodiment, at least one inner layer is made of polytetrafluoroethylene as fluoropolymer which is not melt processible.

For the multi-layer-structure fluoropolymer of the present invention, as a preferred embodiment, the outermost layer is made of tetrafluoroethylene/perfluoro(alkyl vinyl ether) copolymer, or other melt processible fluoropolymer, and at least one inner layer is made of polytetrafluoroethylene as fluoropolymer which is not melt processible.

The multi-layer-structure fluoropolymer of the present invention is composed of said multi-layer-structure fluoropolymer particles. It may be a fluoropolymer as a mixture containing at least two types of multi-layer-structure fluoropolymer particles. Molding of the fluoropolymer in this case is preferably performed at a temperature higher than the lowest melting point among the melting points of the fluoropolymers that form the outermost layer and lower than the melting point of the fluoropolymer having the highest melting point.

Also, the multi-layer-structure fluoropolymer of the present invention may be a mixture containing at least one type of said multi-layer-structure fluoropolymer and at least one type of non-multi-layer-structure fluoropolymer particle. In this case, it is preferred that molding of the fluoropolymer be performed at a temperature higher than the melting point of the fluoropolymer of the outermost layer of the multi-layer-structure fluoropolymer and lower than the melting point of the fluoropolymer having the highest melting point.

In this case, it is preferred that, with respect to the multi-layer-structure fluoropolymer, the proportion of the non-multi-layer-structure fluoropolymer be adjusted appropriately so as to obtain the desired characteristics of the molding.

There is no specific restriction on the method for obtaining the mixture. As a preferred method, one may adopt a method in which a water based dispersion containing the multi-layer-structure fluoropolymer and a water based dispersion containing the non-multi-layer-structure fluoropolymer are mixed. When the mixture of the present invention is obtained using this method, it is preferred that the composition of the water based dispersion of the fluoropolymer and the mixing ratio be adjusted appropriately so that the composition of the mixture is within the above described range.

As a preferred embodiment, the water based dispersion of fluoropolymer of the present invention is obtained, and is agitated and coagulated to form a coagulation, followed by drying, forming a powder with average particle diameter in the range of 300-600 μm, or preferably about 400 μm. These particles are agglomerates of the dispersion particles described above, which are customarily designated primary particles.

Also, the following scheme may be adopted: the powder of said multi-layer-structure fluoropolymer and the powder of said non-multi-layer-structure fluoropolymer are homogeneously blended using a dry blender, a Henschel mixer, or a high speed rotating blender having a blade or a cutter knife that is driven to rotate at a high speed, forming a mixture.

The melt fluidity (F) of the fluoropolymer of the present invention should be 0.1 or higher, or preferably 1.0 or higher. If the melt fluidity (F) is too low, decrease in the viscosity of the fluoropolymer due to increase in the shear rate (shear stress) can hardly take place, and the moldability tends to deteriorate. The melt fluidity (F) is determined using the following formula (1).

$$F = \frac{\log(MV1) - \log(MV2)}{\log(\gamma 2) - \log(\gamma 1)} \quad (1)$$

(γ: shear rate (sec$^{-1}$), MV1: viscosity at shear rate γ1, MV2: viscosity at shear rate γ2).

The viscosity values at different shear rates are determined using the following formula (2).

$$MV(\text{poise}) = \Delta P/\gamma \quad (2)$$

(ΔP: press-out pressure (MPa) when the sample powder is pressed out at a prescribed shear rate (γ) from an orifice (2 mm in diameter×20 mm in length) on the bottom portion heated to a prescribed molding temperature and measured using a capillary flow tester (Capillograph 1B, product of Toyo Seiki K.K.)) This test is described in more detail in the Examples.

Additives may be included as needed in the fluoropolymer obtained as aforementioned. Examples of additives are oxidation inhibitor, light stabilizer, fluorescence whitening agent, coloring agent, pigment, dye, filler, as well as carbon black, graphite, alumina, mica, silicon carbide, boron nitride, titanium oxide, bismuth oxide, bronze, gold, silver, copper, nickel, or other powder, and fiber powder. Also, one may add fullerene (C60) carbon nano-tubes, or other nano-materials that have become mass-producible and have been commercially available recently. Also, as long as the purpose of the present invention is not degraded, one may also add other polymer micron-sized particles or components other than the fluoropolymer.

The present invention provides a molding method for fluoropolymer characterized by the following facts: the fluoropolymer is composed of fluoropolymer particles each having a multi-layer structure consisting of at least two types of fluoropolymers having different melting points, or a mixture of multi-layer-structure fluoropolymer and non-multi-layer-structure fluoropolymer; said fluoropolymer being molded at a temperature higher than the melting point of the fluoropolymer having the lowest melting point and lower than the melting point of the fluoropolymer having the highest melting point; melt processing is performed at said temperature by means of, for example, melt extrusion molding, injection molding, blow molding, transfer molding, and melt compression molding.

When the polytetrafluoroethylene is used as the fluoropolymer with the highest melting point, and PFA is used as the fluoropolymer with the lowest melting point, molding is performed at a temperature higher than the melting point of the PFA and lower than the melting point of the fluoropolymer PTFE to form beads or pellets from the powder (agglomerates) of the mixture obtained in the above. Then, from said beads or pellets, continuous melt extrusion molding can be performed at a temperature higher than the melting point of the PFA and lower than the melting point of the PTFE. The beads or pellets may be treated to stabilize the unstable terminal groups in the polymers. Such treatments include fluorination, as for example in U.S. Pat. No. 4,743,658, and humid heat treatment, as for example in U.S. Pat. No. 3,085,083.

As an alternative to conventional melt extrusion, the multi-layer-structure fluoropolymer of the present invention can be processed according to the methods typically used with non-melt processible PTFE. In such cases too, the procedure of heating the resulting article at a temperature between the melting point of the lowest melting polymer in the outermost layers, and lower than the melting point of the fluoropolymer having the highest melting point must be followed. For example, after the fluoropolymer particles having said multi-layer structure or the fluoropolymer made of a former-stage mixture are mixed with a conventional paste extrusion assisting agent (lubricant), and the mixture is compressed to form a preparatory molding, the preparatory molding is filled in a paste extruder, and non-melt processing can be performed at a temperature higher than the melting point of the fluoropolymer with the lowest melting point and lower than the melting point of the fluoropolymer with the highest melting point. If there is no need, however, a conventional paste extrusion assisting agent need not be used.

In the fluoropolymer molding method of the present invention, when sintering is performed at a temperature lower than the melting point of the fluoropolymer with the lowest melting point, the molding pressure rises, and, at the same time, the strength and elongation of the obtained molded article deteriorate, and this is undesirable. On the other hand, when sintering is performed at a temperature higher than the melting point of the fluoropolymer with the highest melting point, the crystallinity of the obtained molded article deteriorates, and the chemical liquid resistance, gas impermeability and linear expansion coefficient become poor, and this is undesirable.

According to the fluoropolymer molding method of the present invention, melt processing can be performed, and, at the same time, a high crystallinity of the high-melting point fluoropolymer can be maintained. As a result, it is possible to obtain a molded article with excellent chemical liquid resistance and gas impermeability and low linear expansion coefficient.

For the molded article of the present invention, it is preferred that the linear expansion coefficient at 100-150° C. be 15×10$^{-5}$/K or less so that excellent high-temperature dimensional stability can be realized, and this is preferred. If the linear expansion coefficient is too high, at high use temperatures, sealing of the tubes and joints of the obtained molded article is impaired, so that leaks can develop, or the molded article may deform.

The specific gravity of the molded article of the present invention is preferably in the range of 2.160-2.180. More preferably specific gravity is 2.180 or greater. If the specific gravity of the molded article is too low, the crystallinity of the molding becomes lower, and there is a tendency for the chemical liquid resistance and gas impermeability to deteriorate.

There is no specific restriction on the types of the molded article of the present invention. Examples include tubes, sheets, rods, fibers, packing, cables, linings, containers, tanks, and laminates using the molding of the present invention, as well as other molded articles that are required to have excellent chemical liquid resistance and gas impermeability and low linear expansion coefficient.

The molded article of the present invention can be used preferably in semiconductor applications, CPI applications, OA applications, sliding material applications, automobile applications (such as parts in the engine compartment, electrical wires, oxygen sensors, fuel hoses), and printed circuit board applications.

EXAMPLES

In the following, an explanation is given regarding the application examples and comparative examples pertaining to the present invention. However, the present invention is not limited to these application examples.

The properties in the present invention were measured using the following methods:

(1) Melting Point (Melting Peak Temperature)

A differential scanning calorimeter (Pyris1 Model DSC, product of Perkin Elmer Corp.) is used. 10 mg of the sample powder are weighed and are loaded on a dedicated aluminum dish. After crimping using a dedicated crimper, the sample is accommodated in the DSC main body, and is heated from 150° C. to 360° C. at a rate of 10° C./min. From the melting curve obtained in this case, the melting peak temperature (Tm) is determined.

(2) Melt Flow Rate (MFR)

A melt indexer (product of Toyo Seiki K.K.) equipped with corrosion resistant cylinder, die and piston according to ASTM D-1238-95 is used. 5 g of the sample powder are filled in a cylinder kept at 372±1° C. and are held for 5 min. Under a load of 5 kg (piston and weight), this is pressed through a die orifice, and the extrusion rate in units of g/10 min is determined as the MFR.

(3) Heat of Fusion (Melting Endotherm)

A differential scanning calorimeter (Pyris1 Model DSC, product of Perkin Elmer Corp.) is used. 10 mg of the sample powder are weighed and are loaded on a dedicated aluminum dish. After crimping using a dedicated crimper, the sample is accommodated in the DSC main body, and was heated from 150° C. to 360° C. at a rate of 10° C./min. On the melting curve obtained in this case, the points where the curve is separated from the baseline before and after the melting peak and the points returning to the baseline are connected to each other, and the heat of fusion is determined from the peak area defined by said straight lines. The procedure is described in ASTM D-3418.

(4) Specific Gravity

A compression molder (Hot Press WFA-37, product of Shinto Kogyo K.K.) is used. The sample powder is melt compression molded (4 MPa) at the molding temperature listed in Tables II and III to form a sheet with thickness of about 1.0 mm. From the sheet obtained, a specimen measuring 20 mm in length and 20 mm in width is cut out, and the specific gravity is determined using method A of JIS K7112 (in-water substitution method).

(5) Chemical Liquid Resistance and Gas Impermeability

A compression molder (Hot Press WFA-37, product of Shinto Kogyo K.K.) is used. The sample powder is melt compression molded (4 MPa) at the molding temperature listed in Tables II and III to form a sheet with thickness of about 1.0 mm. For the sheet obtained, the nitrogen gas impermeability at 23° C. is measured using a gas impermeability measurement device (product of Shibata Chemical Machinery Co., Ltd.).

(6) Linear Expansion Coefficient

A compression molder (Hot Press WFA-37, product of Shinto Kogyo K.K.) is used. The sample powder is melt compression molded (4 MPa) at the molding temperature listed in Tables II and III to form a billet. From the obtained billet, a specimen measuring 4 mm in diameter and 20 mm in length is cut out using a lathe. Then, on a TMA TM-7000 (product of Shinku Riko K. K.), the sample is heated from −10° C. to 270° C. at a rate of 5° C./min, the change in dimensions from 100° C. to 150° C. is measured, and the linear expansion coefficient is determined according to ASTM D696.

(7) Surface, Tensile Strength and Elongation of the Extrusion Products

A capillary flow tester (Capillograph 1B, product of Toyo Seiki K.K.) is used. The sample powder is extruded at a shear rate of 15.2 sec$^{-1}$ from an orifice (2 mm diameter×20 mm in length) on the bottom of a cylinder heated to the molding temperature listed in Tables II, III to obtain a string shaped extrusion product (bead). The obtained string shaped extrusion product (bead) is used to measure the surface roughness (Ra(a)) at any 5 sites using a probe type surface roughness shape measurement unit (Tokyo Seimitsu type, Surfcom 575A-3D). When the average value of the surface roughness (R(a)) obtained at said 5 sites is 100 μm or smaller, the surface is taken as smooth.

Also, for the obtained string shaped extrusion product (bead), the maximum strength before rupture and the elongation before rupture are measured on a Tensilon RTC-1310A (product of Orientech Corp., with inter-chuck distance of 22.2 mm and at a stretching speed of 50 mm/min.

(8) Melt Fluidity

The value of F determined using the following formula (1) is taken as the melt fluidity.

$$F = \frac{\log(MV1) - \log(MV2)}{\log(\gamma 2) - \log(\gamma 1)} \quad (1)$$

γ: shear rate (sec−1); γ1=3, γ2=40

MV1: viscosity at shear rate of 3 sec$^{-1}$

MV2: viscosity at shear rate of 40 sec$^{-1}$

The viscosity at each shear rate was determined using the following formula (2).

$$MV(\text{poise}) = \Delta P/\gamma \quad (2)$$

ΔP: press-out pressure (MPa) when the sample powder is pressed out at a prescribed shear rate (γ) from an orifice (2 mm in diameter×20 mm in length) on the bottom portion heated to a prescribed molding temperature and measured using a capillary flow tester (Capillograph 1B, product of Toyo Seiki K.K.).

(Feed Material)

The feed materials used in the application examples and comparative examples pertaining to the present invention are as follows:

(1) Modified PTFE water based dispersion

Hexafluoropropylene-modified PTFE water-based dispersion (about 30 wt % solids, average particle diameter=0.24 μm, melting point at 343° C., MFR=0 g/10 min, and heat of fusion (ΔHf) of 70 J/g)

(2) PFA water-based dispersion

Tetrafluoroethylene/perfluoro(ethyl vinyl ether) copolymer water-based dispersion (about 45 wt % solids, average particle diameter=0.24 μm, melting point at 285° C., MFR=30 g/10 min)

(3) The modified PTFE water-based dispersion is loaded as core agent in a polymerization vessel, and polymerization is performed to produce tetrafluoroethylene/perfluoro(ethyl vinyl ether) copolymer (PFA) polymerized on the surface of the PTFE particles, which become thereby, the core of the resulting particles. The process is repeated. As a result, multi-layer-structure fluoropolymer water-based dispersions are obtained.

The proportions of modified PTFE and PFA are as those listed in Table I, and Samples 1, 2 and 3.

TABLE I

| | Units | Sample 1 | Sample 2 | Sample 3 |
|---|---|---|---|---|
| Type of inner layer | — | Modified PTFE | Modified PTFE | Modified PTFE |
| Content | Wt % | 90 | 70 | 50 |
| Melting point | ° C. | 343 | 343 | 343 |
| Heat of fusion (ΔH) | J/g | 70 | 70 | 70 |
| Type of the outermost layer | — | PFA | PFA | PFA |
| Content | Wt % | 10 | 30 | 50 |
| Melting point | ° C. | 292 | 292 | 292 |
| Heat of Fusion (ΔH) | J/g | 28 | 28 | 28 |
| Average particle diameter | μm | 0.232 | 0.251 | 0.277 |
| Melting point | ° C. | 343 | 343 | 343 |
| Heat of Fusion (ΔH) | J/g | 65 | 53 | 44 |

Application Examples 1-3, Comparative Examples 1, 2

Samples 1-3 are used to perform molding of fluoropolymer at temperature of 320° C. 320° C. is higher than the melting point of the PFA fluoropolymer of the outermost layer and lower than the melting point of the fluoropolymer with the highest melting point (PTFE). For the obtained molding, the specific gravity, nitrogen gas impermeability, linear expansion coefficient, extrusion surface, and elongation are measured. The results are listed in Table II. As controls, for samples 2 and 3, molding is performed at 380° C., higher than the melting point of the fluoropolymer with the highest melting point, and the results are also listed as Comparative Examples 1 and 2 in Table II.

TABLE II

| | Units | Application Example 1 | Application Example 2 | Application Example 3 | Comparative Example 1 | Comparative Example 2 |
|---|---|---|---|---|---|---|
| Sample | — | Sample 1 | Sample 2 | Sample 3 | Sample 2 | Sample 3 |
| Molding temperature | ° C. | 320 | 320 | 320 | 380 | 380 |
| MFR | g/10 min | 0 | 0 | 0 | 0 | 0 |
| Specific gravity | — | 2.275 | 2.250 | 2.216 | 2.145 | 2.149 |
| Nitrogen gas impermeability | — | $0.01 \times 10^{-10}$ | $0.02 \times 10^{-10}$ | $0.10 \times 10^{-10}$ | $0.92 \times 10^{-10}$ | $0.94 \times 10^{-10}$ |
| Linear expansion coefficient | /K | $1.7 \times 10^{-5}$ | $7.3 \times 10^{-5}$ | $12.2 \times 10^{-5}$ | $17.3 \times 10^{-5}$ | $20.5 \times 10^{-5}$ |
| Surface state (bead) | — | Smooth | Smooth | Smooth | Not moldable | Not moldable |
| Maximum tensile strength (bead) | MPa | 30.0 | 23.7 | 19.8 | Not moldable | Not moldable |
| Elongation (bead) | % | 8.0 | 69.2 | 203 | Not moldable | Not moldable |
| Melt fluidity | — | 0.843 | 0.825 | 1.089 | 0.832 | 0.656 |

Application Example 4

The PFA water-based dispersion is blended with sample 1 to provide a blend with equal weights of the multi-layer polymer components, and the mixture is agitated and coagulated to form fluoropolymer as coagulate, followed by drying. Then, molding of the fluoropolymer is performed at 320° C., higher than the fluoropolymer of the outermost layer and lower than the melting point of fluoropolymer with the highest melting point. For the obtained molding: the specific gravity, nitrogen gas impermeability, linear expansion coefficient, extrusion surface, highest strength, and elongation are measured. The results are listed in Table III.

Application Example 5

Fluoropolymer is molded in the same way as in Application Example 4 except that instead of sample 1, sample 2 is used, and, instead of the PFA water-based dispersion, said PTFE water-based dispersion was used. The results are listed in Table III.

Comparative Example 3

Molding of fluoropolymer was performed in the same way as in Application Example 4, except that the molding temperature was changed to 380° C. The results are listed in Table III.

Comparative Example 4

Molding of fluoropolymer was performed in the same way as in Application Example 5, except that the molding temperature was changed to 380° C. The results are listed in Table III.

TABLE III

|  | Units | Application Example 4 | Application Example 5 | Comparative Example 3 | Comparative Example 4 |
|---|---|---|---|---|---|
| Multi-layer polymer | — | Sample 1 | Sample 2 | Sample 1 | Sample 2 |
| Content | wt % | 50 | 50 | 50 | 50 |
| Non-multi-layer polymer | — | PFA | Modified PTFE | PFA | Modified PTFE |
| Content | wt % | 50 | 50 | 50 | 50 |
| Molding temperature | °C. | 320 | 320 | 380 | 380 |
| MFR | g/10 min | 0.00 | 0.00 | 0.00 | 0.00 |
| Specific gravity | — | 2.200 | 2.267 | 2.156 | 2.149 |
| Nitrogen gas impermeability | — | $0.17 \times 10^{-10}$ | $0.015 \times 10^{-10}$ | $0.93 \times 10^{-10}$ | $0.91 \times 10^{-10}$ |
| Linear expansion coefficient | /K | $13.1 \times 10^{-5}$ | $2.24 \times 10^{-5}$ | $21.3 \times 10^{-5}$ | $17.1 \times 10^{-5}$ |
| Surface state (bead) | — | Smooth | Smooth | Not moldable | Not moldable |
| Maximum tensile strength (bead) | MPa | 23.2 | 33.8 | Not moldable | Not moldable |
| Elongation (bead) | % | 117 | 20 | Not moldable | Not moldable |
| Melt fluidity | — | 0.741 | 0.814 | 0.761 | 0.928 |

The present invention provides a type of molding method of fluoropolymer with excellent chemical liquid resistance and gas impermeability and low linear expansion coefficient, and the molded article obtained with said molding method.

The fluoropolymer molding method of the present invention enables melt processing, and it can form molded article with excellent chemical liquid resistance and gas impermeability and low linear expansion coefficient.

The molded article of the present invention has excellent properties, that is, excellent chemical liquid resistance and gas impermeability and low linear expansion coefficient, and it can be used in various fields, such as semiconductor applications, CPI applications, OA applications, sliding material applications, automobile applications (such as parts in the engine compartment, electrical wires, oxygen sensors, fuel hoses), and printed circuit board applications.

What is claimed is:

1. A fluoropolymer molding method for producing a molded article, wherein the fluoropolymer comprises fluoropolymer particles each having a multi-layer structure consisting of at least two types of fluoropolymers having different melting points, with at least one inner layer made of polytetrafluoroethylene having a melt flow rate of 0 g/10 min. as measured by the procedure of ASTM D-1238-95 at a temperature of 372±1° C. and a load of 5 kg, and wherein said fluoropolymer of the outermost layer is tetrafluoroethylene/perfluoro(alkyl vinyl ether) copolymer (PFA), and wherein said fluoropolymer particles comprise from 70 to 95 weight percent of said polytetrafluoroethylene having a melt flow rate of 0 g/10 min., said method comprising molding said fluoropolymer at a temperature higher than the melting point of said tetrafluoroethylene/perfluoro(alkyl vinyl ether) copolymer (PFA) of said outermost layer and lower than the melting point of said polytetrafluoroethylene having a melt flow rate of 0 g/10 min., and thereby forming said molded article.

2. The fluoropolymer molding method described in claim 1 wherein the heat of fusion (Hf) of said polytetrafluoroethylene is 45 J/g or higher.

3. The fluoropolymer molding method described in claim 1 wherein the multi-layer-structure fluoropolymer is a mixture containing at least two types of multi-layer-structure fluoropolymer particles.

4. The fluoropolymer molding method described in claim 1 wherein the multi-layer-structure fluoropolymer is a mixture of at least one type of multi-layer-structure fluoropolymer and at least one type of non-multi-layer-structure fluoropolymer.

5. A molded article prepared using the fluoropolymer molding method described in claim 1.

6. The molded article described in claim 5, wherein the molded article has a linear expansion coefficient at 100-150° C. of $7.3 \times 10^{-5}$/K or less.

7. The molded article described in claim 5 wherein the specific gravity of the molded article is 2.180 or greater.

* * * * *